United States Patent [19]

Acres et al.

[11] 4,123,500

[45] Oct. 31, 1978

[54] RECOVERY OF PRECIOUS METALS BY OXIDATION IN THE AQUEOUS PHASE OF ASSOCIATED CARBONACEOUS SUPPORT MATERIAL

[75] Inventors: Gary J. K. Acres; Alfred J. Bird, both of London, England

[73] Assignee: Johnson, Matthey & Co., Limited, London, England

[21] Appl. No.: 759,551

[22] Filed: Jan. 14, 1977

Related U.S. Application Data

[63] Continuation of Ser. No. 553,066, Feb. 25, 1975, abandoned.

[30] Foreign Application Priority Data

Mar. 1, 1974 [GB] United Kingdom ............... 9393/74

[51] Int. Cl.$^2$ .................... C01G 5/00; C22B 11/04; B01J 23/96; B01J 21/20
[52] U.S. Cl. ................................. 423/35; 75/118 P; 75/121; 252/416; 252/420
[58] Field of Search ............... 252/420, 416; 423/22, 423/23, 35; 75/83, 118 R, 121, 118 P; 210/63 R

[56] References Cited

U.S. PATENT DOCUMENTS

| 2,344,208 | 3/1944 | Kirkpatrick | 252/413 |
|---|---|---|---|
| 2,944,396 | 7/1960 | Barton et al. | 210/63 R |
| 3,150,105 | 9/1964 | Ledding | 252/416 |
| 3,364,136 | 1/1968 | Chem et al. | 252/416 |
| 3,386,922 | 6/1968 | Rothschild et al. | 252/416 |
| 3,557,019 | 1/1971 | Van Driesem | 252/420 |
| 3,632,336 | 1/1972 | Cameron | 75/83 |
| 3,671,222 | 6/1972 | Johnson | 75/83 |
| 3,870,631 | 3/1975 | Fassell et al. | 210/63 R |
| 3,953,502 | 4/1976 | Fassell et al. | 423/23 |

*Primary Examiner*—P. E. Konopka
*Attorney, Agent, or Firm*—Cushman, Darby & Cushman

[57] ABSTRACT

This invention relates to the recovery of precious metals. More particularly, the invention relates to a process for the recovery of a catalytic metal from a carbonaceous residue or support comprising subjecting an aqueous slurry of material containing catalytic metal to be recovered to a temperature of not less than 200° C and a pressure not less than 75 atmospheres in an atmosphere comprising a quantity of oxygen at least sufficient to oxidize substantially all the carbon present, the oxidation being carried out in the presence of a liquid aqueous phase. The process also relates to the recovery of silver from photographic film.

2 Claims, No Drawings

RECOVERY OF PRECIOUS METALS BY OXIDATION IN THE AQUEOUS PHASE OF ASSOCIATED CARBONACEOUS SUPPORT MATERIAL

This is a continuation, of application Ser. No. 553,066 filed Feb. 25, 1975, now abandoned.

This invention relates to the recovery of precious metals; more particularly it relates to the recovery of precious metals such as the platinum group metals from carbon containing supports or residues and of silver from photographic celluloid or emulsion.

Large quantities of silver are used in the photographic industry and recovery processes at present in use are normally quite expensive. Catalysts which are frequently used in the pharmaceutical industry and in the field of preparative organic chemistry generally comprise platinum group metals deposited upon charcoal or carbon supports. Another support which is frequently used is alumina. Such supports are nearly always in particulate or granular form.

After a certain period of use most of these catalysts are rendered inactive in so far that the catalytic surface has either been poisoned by one or more of the other constituents present in the reaction environment, or it becomes covered with some form of deposit or residue from the reaction which is usually carbonaceous. The value of the catalytic metal present, however, makes its recovery or regeneration worthwhile. Recovery or regeneration is normally carried out by controlled combustion in which the carbonaceous residue and the charcoal or carbon support is gradually burnt-off leaving the catalytic metal (not normally susceptible to oxidation) behind.

The main problems associated with this procedure are the difficulties in controlling the oxidation. There is the danger of ignition of the carbon and the possibility that the process may release explosive vapours. Uncontrolled oxidation in any form will result in the loss of a great deal of precious metal through the exhaust flue. There is also the possibility of transition metal carbonyl formation and as these are extremely volatile compounds, loss of a great deal of precious metal can similarly result. The controlled combustion process is, therefore, a relatively expensive one to operate.

It is an object of the present invention to overcome many of the difficulties associated with the traditional method of catalytic metal recovery as described above.

According to one aspect of the present invention a process for the recovery of a catalytic metal from a carbonaceous residue or support comprises subjecting an aqueous slurry of material containing catalytic metal to be recovered to a temperature of not less than 200° C. and a pressure not less than 75 atmospheres in an atmosphere comprising a quantity of oxygen at least sufficient to oxidise substantially all the carbon present, the oxidation being carried out in the presence of a liquid aqueous phase.

According to a second aspect of the present invention a process for the recovery of silver from photographic film comprises subjecting the film in contact with water at a temperature of not less than 200° C. and a pressure not less than 75 atmospheres in an atmosphere comprising a quantity of oxygen at least sufficient to oxidise substantially all the carbon present, the oxidation being carried out in the presence of a liquid aqueous phase. Preferably, the method according to each aspect of the invention is carried out in an autoclave.

The presence of water in the aqueous slurry and in the reaction according to the second aspect of the invention not only serves as a control for the reaction, but also prevents, or at least substantially reduces, the conditions of the respective reactions becoming liable to explosion.

In each aspect of the invention an excess of substantially pure oxygen is preferably present. Preferably also, the temperature is increased gradually to about 100° C., maintained at this point for 2-3 hours, increased to 200° C. and maintained at 200° C. for another 10 hours. The preferred rate of increase of temperature is 100° C. per hour and of decrease 100° C. per hour.

Organic material (e.g. celluloid film) associated with the catalytic or photographic metal will oxidise faster than a carbon or graphite catalyst support. Reaction conditions therefore need to be carefully controlled in a manner dependent upon the carbonaceous material present in the autoclave.

In some embodiments of the present invention it is useful to have an oxidation catalyst present. Suitable catalysts which may be used are Li, Na, K, Ca, Sr and Ba (which form the peroxides) and the transition metals: V (present as $V_2O_5$), Fe (present as $FeCl_3$) Co, Ni, Cr, Mn, Ti, Mo, W, Ag, Re, U, Ru, Rh Pd, Os, Ir, Pt and other elements: Sb, Bi, Sn and S (as sulphate).

On completion of the oxidation, the autoclave is allowed to cool to room temperature and is carefully vented. Rhodium, palladium, iridium and platinum remain as finely divided suspensions in the aqueous phase and may be filtered off. Silver, ruthenium and osmium remain as the oxide, ruthenate and osmate respectively and are recovered by known chemical techniques.

EXAMPLE 1

The palladium from 10 grams of a Pd on C catalyst containing 5.0% Pd (w/w) was recovered using a process as herein described. A temperature of 200° C. and a pressure of 75 atmospheres oxygen was maintained from 4 hours over an aqueous slurry containing 250 mls. water. Recovery of Pd: 97.7% by weight.

EXAMPLE 2

Recovery of Pt and Ru from fuel cell electrodes

The electrodes comprised Pt-Ru mixtures deposited upon carbon and having binders containing polypropylene and PTFE and mounted on polypropylene foil. The assemblies were placed in water and the same procedure was used as in Example 1. Although the PTFE did not oxidise, the platinum group metals were left in suspension entirely free from carbonaceous material. They were, therefore, readily filtered-off and recovered by known chemical techniques.

Other Examples are set out in the following Table showing the results of high pressure oxygen oxidation of the support material from various types of catalyst.

| Run No. | Catalyst Support | Metal Loading % | Water Content % | Temp. °C | Pressure (ATM) | Duration Of Run (Hrs) | Weight Uncorrected | % Age Metal Recovered |
|---|---|---|---|---|---|---|---|---|
| 1. | Charcoal | 5% Pd | Excess | 250 | 100 | 4.0 | 82.4 | 96.7 |
| 2. | Charcoal | 10% Pd | Excess | 250 | 100 | 13 | 83.8 | 99.7 |
| 3. | Ion Exchange Resin | 4.25% Pt | Excess | 250 | 100 | 15 | 63.4 | 100.3 |
| 4. | PTFE | Pt/Ru | Excess | 250 | 100 | 5.5 | * | 78.2 |
| 5. | PVC | Pt/Ru | Excess | 250 | 100 | 13 | * | 77.7 |

*In the Table, the subject of Runs 4 and 5 was fuel cell electrodes. These two runs were carried out in order to determine the extent to which recovery could be obtained from very low metal loadings. In these two cases loadings were about 0.2 mg. metal per gm of substrate.

The effect of temperature and pressure on the rate of oxidation and the consequent percentage metals recovery should be considered in combination and, from the above Examples, it will be seen that the lowest values thereof are 200° C. and 75 atmospheres respectively.

What we claim is:

1. A process for the recovery of silver from photographic film comprising subjecting the film in contact with water at a temperature of not less than 200° C. and a pressure not less than 75 atmospheres in an atmosphere comprising a quantity of oxygen at least sufficient to oxidise substantially all the carbon present, the oxidation being carried out in the presence of a liquid aqueous phase, and recovering silver as the oxide from said water.

2. A process according to claim 1, wherein the oxygen present is substantially pure oxygen.

* * * * *